US007035558B2

(12) United States Patent
Rodriguez

(10) Patent No.: US 7,035,558 B2
(45) Date of Patent: Apr. 25, 2006

(54) METHOD OF DETECTING A ROTATION OF PRINT CARTRIDGE COMPONENTS

(75) Inventor: Santiago Rodriguez, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 10/777,382

(22) Filed: Feb. 11, 2004

(65) Prior Publication Data

US 2005/0175364 A1 Aug. 11, 2005

(51) Int. Cl.
*G03G 15/00* (2006.01)
*G03G 15/01* (2006.01)
*B41J 2/385* (2006.01)
*G01D 15/06* (2006.01)

(52) U.S. Cl. ........................ 399/49; 399/301; 347/116

(58) Field of Classification Search ................. 399/13, 399/15, 49, 298, 301, 302, 303
See application file for complete search history.

(56) References Cited

U.S. PATENT DOCUMENTS

| | | | | |
|---|---|---|---|---|
| 5,233,402 | A | 8/1993 | Yagi et al. | |
| 5,499,092 | A * | 3/1996 | Sasaki | 399/302 |
| 5,550,625 | A * | 8/1996 | Takamatsu et al. | 399/301 |
| 5,715,498 | A * | 2/1998 | Takeuchi et al. | 399/301 X |
| 6,008,826 | A | 12/1999 | Foote et al. | |
| 6,137,970 | A | 10/2000 | Sasago | |
| 6,246,841 | B1 | 6/2001 | Merrifield et al. | |
| 6,266,073 | B1 | 7/2001 | Yergenson | |
| 6,285,849 | B1 * | 9/2001 | Shimada et al. | 399/301 |
| 6,381,435 | B1 * | 4/2002 | Shinohara et al. | 399/301 |
| 6,408,157 | B1 * | 6/2002 | Tanaka et al. | 399/301 |
| 6,619,209 | B1 * | 9/2003 | Dreher et al. | 347/116 X |
| 6,693,654 | B1 * | 2/2004 | Shinohara | 347/116 |
| 6,714,224 | B1 * | 3/2004 | Yamanaka et al. | 347/116 |
| 6,829,465 | B1 * | 12/2004 | Yamanaka et al. | 399/301 |

* cited by examiner

*Primary Examiner*—Sandra L. Brase

(57) ABSTRACT

A method of detecting rotation of at least one printer component includes forming at least one pattern on a marking material receiving part, moving the marking material receiving part past a sensor configured to detect the presence of the pattern, sensing the marking material receiving part with the sensor, and selectively operating a printing system in response to a positive detection of the pattern.

50 Claims, 6 Drawing Sheets

METHOD OF DETECTING A ROTATION OF PRINT CARTRIDGE COMPONENTS

BACKGROUND

Traditional color laser printers have a plurality of a removable toner cartridges disposed therein for providing a supply of differently colored toners. The removable toner cartridges include photoconductive drums rotatably supported in cleaner housings. Each of the toner cartridges also include a developer roller rotatably supported in a developer housing coupled to the cleaner housing. The developer rollers transfer toner from the developer housings to the photoconductive drums, when both are rotating, to print a latent image on a recording marking material receiving part.

The developer roller and the photoconductive drum are sometimes coupled to independently rotated gear assemblies. If the photoconductive drum is not properly engaged, it will remain stationary. If the developer roller rotates while the photoconductive drum is stationary, toner developed on the developer roller will be forced from the developer roller and out of the print cartridge. This uncontrolled release of toner, or toner dump, results in failure of the printing operation. If possible, the dumped toner must then be painstakingly removed from the system before the printing operation can be resumed. In some cases, the toner dump may be so extensive as to render further operation of the printing system impractical.

In order to detect rotation of the photoconductive drum, and subsequently prevent toner dump, a number of traditional systems have been developed to measure the torque and current used by the motor circuit that rotates the photoconductive drum. These traditional methods for detecting the rotation of the photoconductive drum are often difficult to implement due to the variation of motor loads across a number of different environments. In addition, such systems include additional sensors, which add expense and complication to the system.

SUMMARY

A method of detecting rotation of at least one printer component includes forming at least one pattern on a marking material receiving part, moving the marking material receiving part past a sensor configured to detect the presence of the pattern, sensing the marking material receiving part with the sensor, and selectively operating a printing system in response to a positive detection of the pattern.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

The present specification illustrates a number of exemplary systems and methods of detecting rotation of at least one printer component. More specifically, the present systems and methods include forming at least one pattern on a marking material receiving part, moving the marking material receiving part past a sensor configured to detect the presence of the pattern, selectively operating a printing system in response to a positive detection of the pattern, and preventing operation of the printing system if there is a non-detection of the pattern.

As used in the present specification and in the appended claims, the term "marking material receiving part" is meant to be understood broadly as referring to any belt or substrate that may be passed adjacent to a print cartridge and a sensor during a print operation. A "marking material receiving part" may include, but is in no way limited to, an ink receiving substrate such as a sheet of paper or a sheet of plastic, or components of a printing device such as a transfer belt or an electronic transfer belt. Additionally, the phrase "color plane registration operation" is meant to be understood broadly as referring to any operation performed by a printing device to assure correct print cartridge position and/or ink deposition concentrations. A marking material is to be broadly understood to include material capable of making marks on a receiving part including, but in no way limited to toner, ink, etc.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
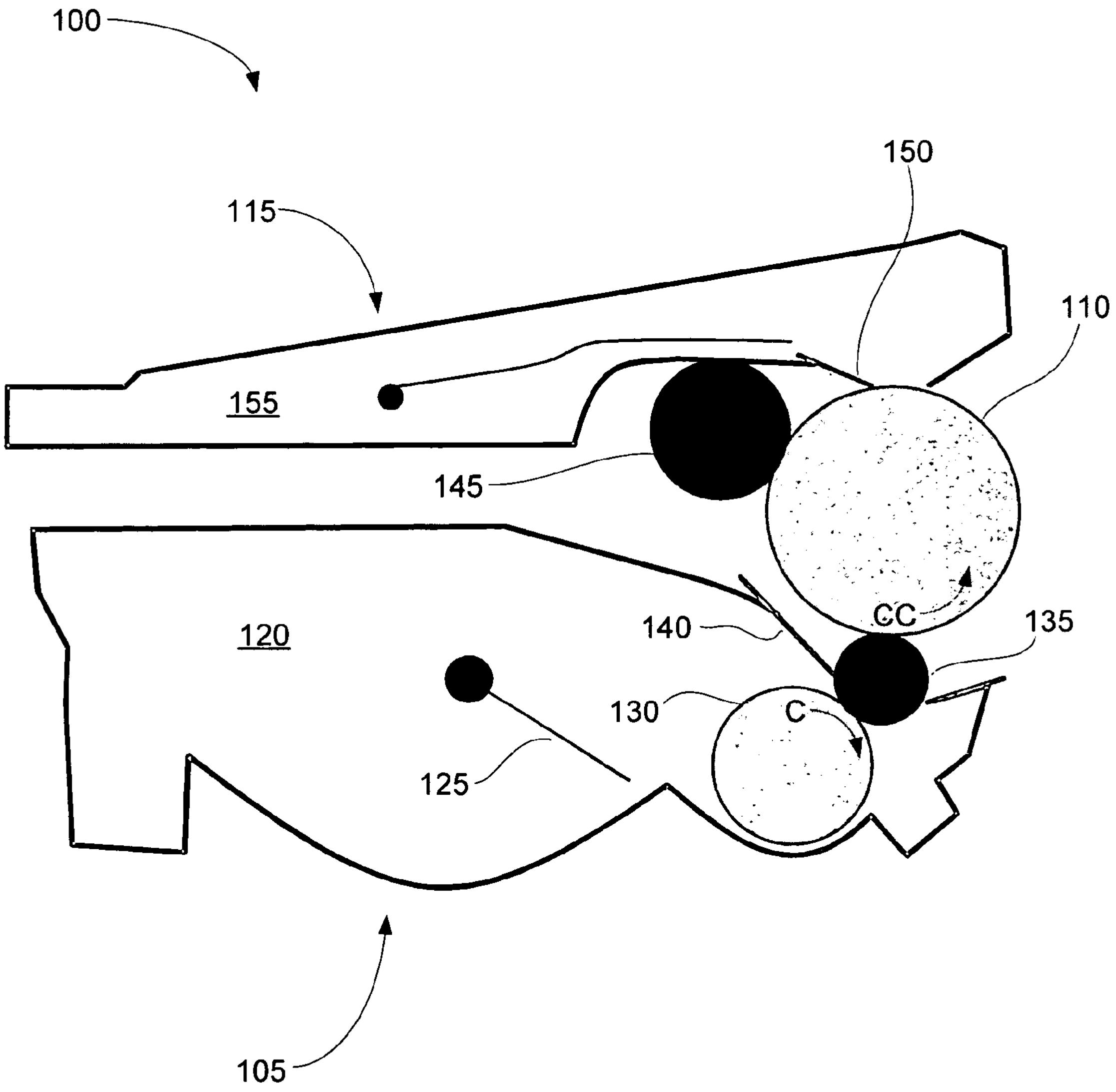
FIG. 1 is a cross-sectional side view illustrating a print cartridge according to one exemplary embodiment.

FIG. 1 illustrates a print cartridge (100), such as a laser print cartridge, according to one exemplary embodiment. As shown in FIG. 1, the print cartridge (100) may generally include a developer unit (105), an organic photo conductor (OPC) drum (110), and a cleaning unit (115). The developer unit (105) transfers a marking material to the OPC drum (110) to form a marking material or toner image thereon. For ease of reference, "marking material" will be referred to as "toner." It should be understood that any suitable marking material may be used. Once transferred to the OPC drum (110), the toner image is subsequently transferred to a marking material receiving part. Toner remaining on the OPC drum (110) after the toner image has been transferred to the marking material receiving part is removed by the cleaning unit (115). The specific operation of each of these components will be discussed in further detail below.

The developer unit (105) includes a hopper (120), a stirrer (125), an RS roller (130), a developer roller (135), and a developer blade (140). The developer unit (105) is configured to develop a consistent layer of toner onto the developer roller (135). Additionally, the developer unit (105) may be coupled to a gear, a belt, or any other drive mechanism.

The hopper (120) is configured to contain a volume of toner. Further, the toner is contained in such a manner that it may be made readily available for use in printing operations. Accordingly, the toner may be any toner suitable for printing operations. The stirrer (125) is configured to rotate in a counter clockwise direction (CC) to assure that a quantity of toner is provided to the RS roller (130). According to one exemplary embodiment, the RS roller (130) also rotates in a counter clockwise direction (CC) against the developer roller (135) to create a scrubbing action that removes any toner that was not developed onto the developer roller (135) and returns it to the supply. The RS roller (130) may be charged, such that it creates a charge in the toner. Charging the toner increases the rate with which the toner is developed onto the developer roller (135). As the RS roller (130) rotates, toner is transferred to the developer roller (135). While the rotational directions of the above-mentioned rollers are described as clockwise or counter clockwise, the rollers may independently rotate in any number of directions and still apply the present method.

Similar to the RS roller (130), the developer roller (135) also rotates in the clockwise direction (C) according to one exemplary embodiment. Simultaneous clockwise rotation of both the developer roller (135) and the RS roller (130) may be facilitated by a small idler roller (not shown) disposed between the RS roller (130) and the developer roller (135). The rotation of the developer roller (135) enables toner to be transported onto the surface of the OPC drum (110) in accordance with the charge states resident thereon. As the developer roller (135) rotates away from contact with the RS roller (130) the toner is doctored or smoothed. Before it is transferred to the developer roller (135), excess toner is removed by the developer blade (140).

As shown in FIG. 1, the developer blade (140) is placed in contact with the developer roller (135). The developer blade (140) is of a material that is sufficiently compliant to prevent the developer blade (140) from damaging the developer roller (135) while being sufficiently stiff to allow the removal of excess toner from the developer roller (135). The proximity of the developer blade (140) with respect to the developer roller (135) allows the developer blade (140) to remove excess toner developed onto the developer roller (135) and return it to the hopper (120). Consequently, the developer unit (105) is able to introduce a toner layer having a consistent thickness to the OPC drum (110). This layer of toner is then used in the formation of a toner image on the OPC drum (110).

The organic photo conductors (OPCs) used by the print cartridge (100) illustrated in FIG. 1 are well known in the imaging art. OPCs are configured to have a charge state established thereon in well defined locations. In the exemplary print cartridge (100) illustrated in FIG. 1, the OPC drum (110) rotates in a counter-clockwise direction (CC). According to one exemplary embodiment, the OPC drum (110) is coupled to a spline gear, which is rotated independently of the gear or other drive mechanism used to drive the rotating components of the developer unit (105). If not closely monitored, the developer unit (105) may be over-driven or rotated such that the developer roller (135) is rotated faster than the OPC drum (110). Overdriving the developer roller (135) increases the amount of toner developed onto the OPC drum (110).

The surface of the OPC drum (110) includes a chargeable material. In order to selectively charge the surface of the OPC drum (110), it is placed in contact with a charge roller (145), which places the OPC drum (110) in the proper charge state. Thereafter, a laser assembly (210, FIG. 2) is controlled to scan the OPC drum (110) imparting charge states thereon in accordance with a particular color plane image or pattern. For example, the laser scanner may form a pattern of tick marks on the OPC drum (110).

As the OPC drum (110) rotates, the charge pattern comes into contact with toner, which has been developed onto the developer roller (135). Toner on the developer roller (135) is attracted to the charge pattern on the OPC drum (110). As a result, toner is transferred to those portions of the OPC drum (110) corresponding to the charge pattern on the OPC drum (110). The transfer of toner from the developer roller (135) to the OPC drum (110) results in the formation of a toner image on the OPC drum (110). The toner image on the OPC drum (110) is then transferred to a marking material receiving part such as a transfer belt (250, FIG. 2), as will be discussed in more detail below.

Excess toner remaining on the OPC drum (110) after the toner image has been transferred to the transfer belt (250, FIG. 2) or other marking material receiving part is removed by the cleaning unit (115). The cleaning unit generally includes a cleaning blade (150) coupled to a waste hopper (155). The cleaning blade (150) is placed in contact with the OPC drum (110). As the OPC drum (110) rotates past the cleaning blade, the cleaning blade removes excess toner from the OPC drum (110) and directs it to the waster hopper (155). The waste hopper (155) is configured to contain the excess toner and thus prevent it from escaping from the print cartridge (100). As the OPC drum (110) is rotated past the charge roller (145), the charge roller returns the OPC drum (110) to the proper charge state. At this point, the OPC drum (110) is again in condition to have the laser assembly (210, FIG. 2) form a charge pattern on the OPC drum (110).

Accordingly, the print cartridge (100) includes the developer unit (105) that transfers toner to the OPC drum (110) to form a toner image thereon. The toner image is then transferred to a marking material receiving part. Toner remaining on the OPC drum (110) after the toner image has been transferred to the marking material receiving part is removed by the cleaning unit (115).

Figure 2:
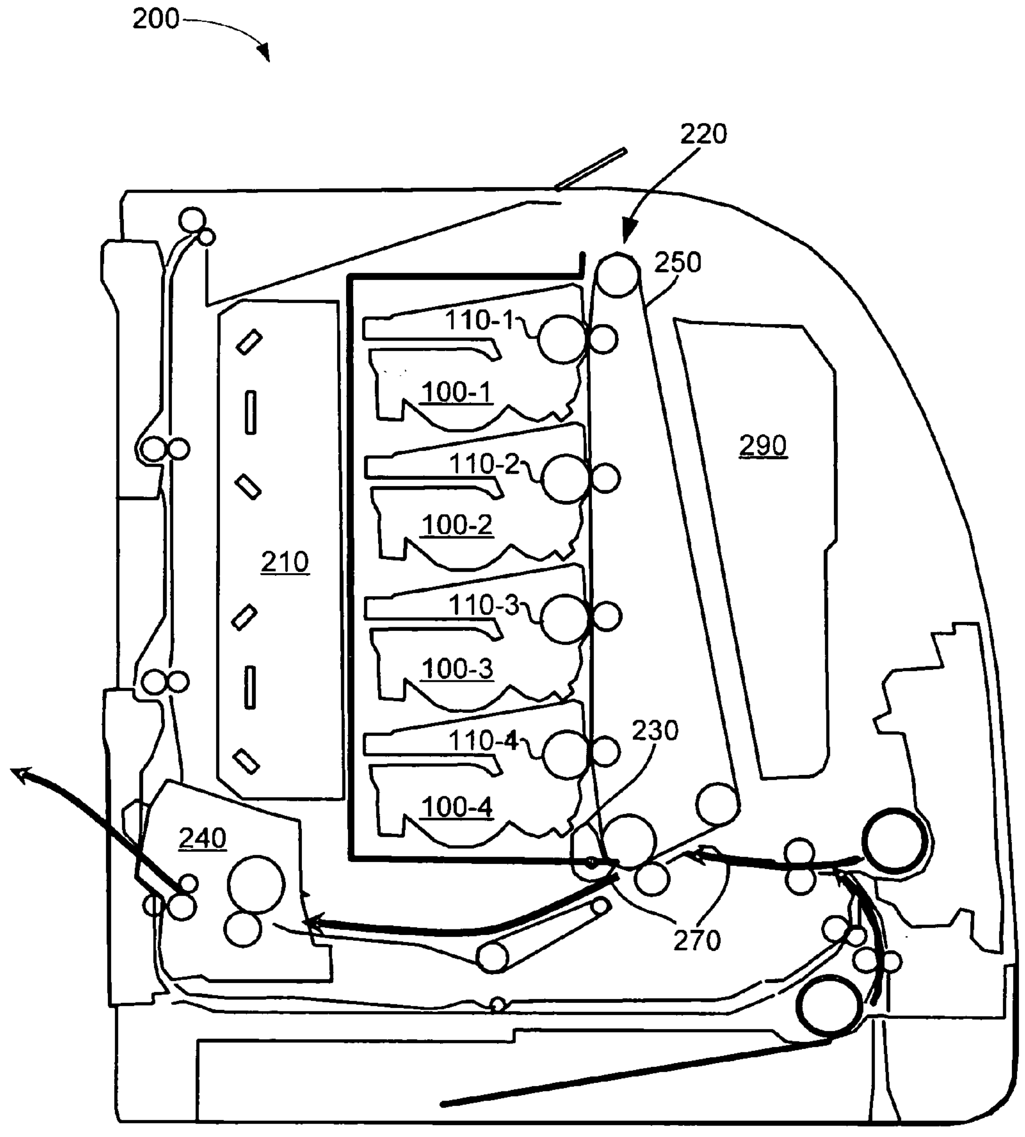
FIG. 2 is a cross-sectional view illustrating a printing system according to one exemplary embodiment.

FIG. 2 illustrates a printing system (200) incorporating a plurality of print cartridges (110). As shown in FIG. 2, the printing system (200) generally includes a plurality of print cartridges such as a black (K) print cartridge (100-1), a cyan (C) printer cartridge (100-2), a magenta (M) printer cartridge (100-3), and a yellow (Y) print cartridge (100-4). The printing system illustrated in FIG. 2 further includes a laser assembly (210), an image transfer assembly (220), an optical sensor (230), and a fusing module (240).

During operation, each of the print cartridges (100-1, 100-2, 100-3, 100-4) forms an image on a transfer belt (250) of the image transfer assembly (220). Each of the color plane sub-images or sub-patterns corresponds to a color plane sub-pattern. For example, the K print cartridge (100-1) contains black toner. The image generated by the K print cartridge (100-1) transfers a black color plane sub-image onto the transfer belt (250). Similarly, the image generated by the C print cartridge (100-2) transfers a cyan color plane sub-pattern onto the transfer belt (250), the M print cartridge (100-3) transfers a magenta color plane sub-pattern, and the Y print cartridge (100-4) transfer a yellow color plane sub-pattern. The image transfer assembly (220) rotates the transfer belt (250) in a clockwise direction (C). Patterns or images transferred to the transfer belt (250) make their way from the print cartridges (100-1, 100-2, 100-3, 100-4) around the image transfer assembly (220). During a startup operation, prior to the introduction of a print receiving media sheet, the images continue on the transfer belt (250) until they pass the optical sensor (230). The sensor (230) is configured to detect the presence of patterns or images and pass that information on to a controller (not shown). As will be discussed in more detail below, the detection or non-detection of the presence of each of the patterns will allow a controller to determine whether the OPC drums (110-1, 110-2, 110-3, and 110-4) are rotating.

Exemplary Implementation and Operation

During a printing operation, the image is transferred from the transfer belt (250) to a media sheet, such as a sheet of paper. The media sheet makes its way through the media path (270). The media sheet is brought to a proper charge state by a media charge roller. The image formed on the transfer belt (250) is then transferred to the media sheet. The media sheet advances along the media path (270) through the fusing assembly (240). The fusing assembly (240) fuses the image onto the media sheet by melting the toner onto the media sheet. After the media sheet has passed through the fusing assembly (240), the imaging operation is complete and the imaged media sheet is output.

According to one exemplary embodiment, the printing system (200) illustrated in FIG. 2 is configured to perform a rotation detection operation and a color plane registration (CPR operation). Accordingly, as will be described in detail below, each laser scanner of the laser assembly (210) in combination with its associated print cartridge (100-1, 100-2, 100-3, and 100-4), causes the printing of a set of color sub-patterns, which include rotation detection marks and/or alignment marks directly onto the transport belt (250) or other marking material receiving part. The rotation detection and/or alignment marks are then sensed by the optical sensor (230) that is positioned downstream from the respective print cartridges (100-1, 100-2, 100-3, and 100-4 respectively). Further, as the transfer belt (250) or other marking material receiving part moves, the rotation detection and/or alignment marks may be removed by a cleaning assembly (290) which is part of the image transfer assembly (220).

As will be later explained, each print cartridge (100) imprints four marks on the transfer belt (250) according to one exemplary embodiment. A first set of marks (e.g., tick marks) are printed such that they are adjacent an edge of the transfer belt (250) and are positioned so as to orient their long dimensions orthogonal to the process direction (i.e., direction of transfer belt movement). This first set of marks may be used exclusively as rotation detection marks or they may also serve as a pattern of alignment marks. The alignment marks, corresponding to each print cartridge, include a pair of lines that are positioned along opposed edges of the transfer belt (250) and are oriented at oblique angles to the process direction of transfer belt (250). Accordingly, print cartridges (100-1, 100-2, 100-3, and 100-4) imprint at least four patterns including eight rotation detection marks, which may be used as a first set of alignment marks, and eight additional alignment marks on the transfer belt (250). The presence of each of the rotation detection marks is detected by the optical sensor (230). For color plane registration, sensor circuitry determines the timing between the sensing of the alignment marks of each pair and the sensing of a pair of alignment marks, which are printed by one, print cartridge and serve as reference marks (e.g., the marks from K print cartridge (100-1)). As the sensor circuitry determines the timing between sensing the alignment marks, error values are derived from the mark timing measurements if the sensor circuitry determines differences between (i) expected time intervals between marks and (ii) measured time intervals between marks.

Figure 3:
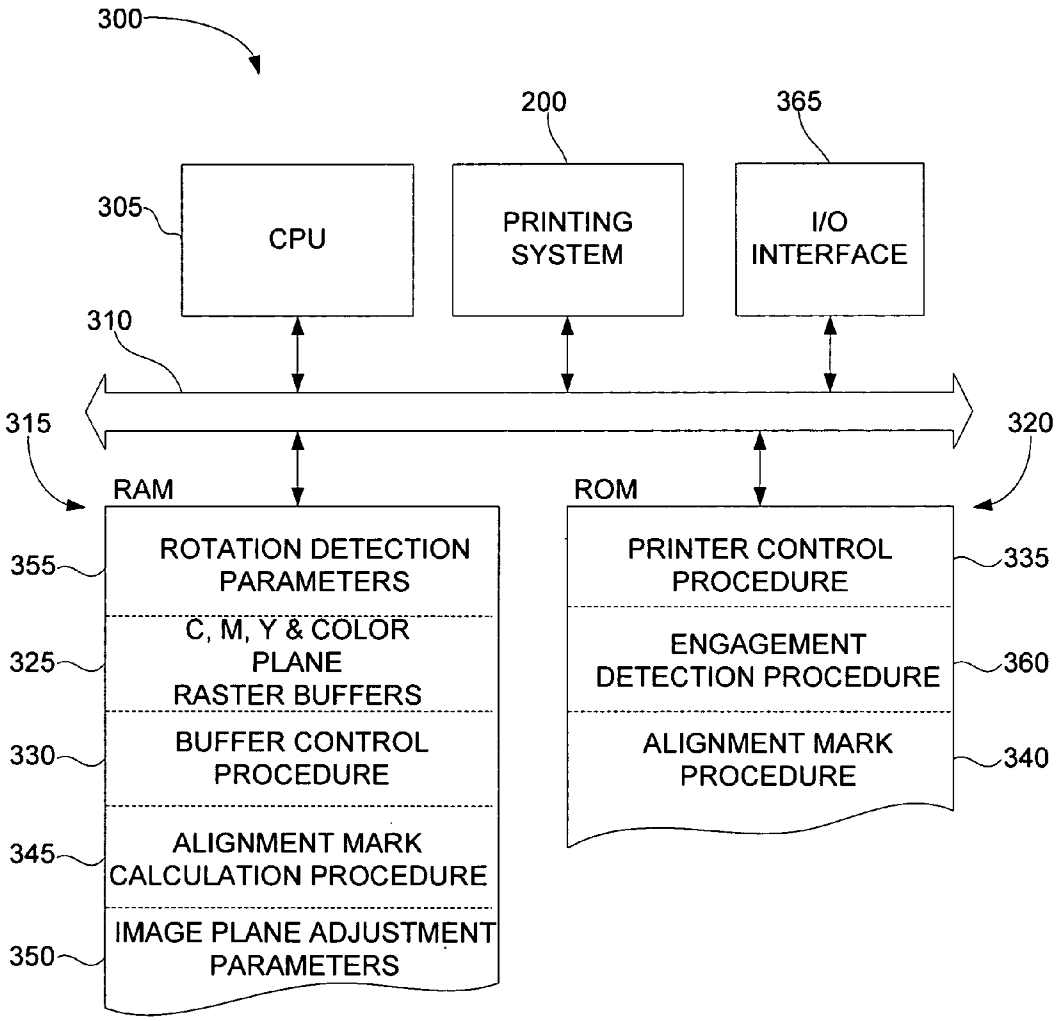
FIG. 3 is a high level block diagram of a controller according to one exemplary embodiment.

FIG. 3 is a high level block diagram illustrating a controller (300) which is utilized to operate the printing system (200), and further to control the color sub-image alignment process and rotation-detection of the OPC drum (110; FIG. 1). The present method assumes that the presence of toner has been separately confirmed by other hardware coupled to the controller. The controller (300) includes a central processing unit (305) or CPU, which communicates via a bus system (310) with a printing system (200), a random access memory (RAM) (315), and a read only memory (ROM) (320). For exemplary purposes, it will be assumed that certain procedures are contained within either RAM (315) or ROM (320). However, one skilled in the art will realize that such procedures are not necessarily stored as separate code segments, but may be integrated with other code that is operable to control the printing system (200). Accordingly, the specific positioning and arrangement of the code procedures is to be understood as exemplary only.

RAM (315) stores a pattern or image to be printed as individual color sub-images in C, M, Y and K color plane raster buffers (325). A buffer control procedure (330) controls the output of data from color plane raster buffers (325) to the printing system (200). A printer control procedure (335) in ROM (320) provides overall control of printing system (200) and institutes calls for the various procedures shown in the RAM (315), as they are desired. An alignment mark procedure (340) causes the rotation detection marks and the alignment marks, referenced above, to be printed on the transfer belt (250; FIG. 2). An alignment mark procedure (340) may be caused to operate between individual media sheets passing through printing system (200) or intermittently, when called for.

An alignment mark calculation procedure (345, in the RAM (315)) is invoked to calculate timing and timing variations of the sensed alignment marks and to further derive adjustment parameters that are stored in image plane adjustment parameters region (350) of the RAM (315). Those adjustment parameters are utilized to control the buffer control procedure (330) so that any offset, skew, or width variations that are sensed for an image color plane are corrected by alteration of image data flow from color plane raster buffers (325).

Accordingly, the controller (300) allows for a color plane registration operation. In addition, the controller (300) is configured to detect operation or rotation of the OPC drum (110; FIG. 1). As previously discussed, a plurality of marks is formed on the transfer belt (250; FIG. 2). The rotation detection marks are formed by, and hence correspond to, each of the print cartridges (100-1, 100-2, 100-3, and 100-4). The same optical sensor (230; FIG. 2) may be used to perform the rotation detection operation as is used to perform the color plane registration operation. Alternatively, separate sensors may be designated to perform the rotation detection operation and the color plane registration operation.

When a rotation detection operation is performed, the detection of the rotation detection marks is compared to rotation detection parameters (355) residing on the RAM (315). The rotation detection parameters (355) detect whether marks corresponding to each of the print cartridges (100-1, 100-2, 100-3, and 100-4) have been formed on the transfer belt (250; FIG. 2). In the case that marks corresponding to each of the print cartridges are detected, an engagement detection procedure (360) directs the printing system (200) to conduct the color plane registration and printing operations normally. In the event that any of the plurality of mark(s) is not detected, the engagement detection procedure (360) prevents further operation of the printing system. Instead, the printer control procedure (335) provides a prompt to an input/output interface (365). The prompt directs a user to reengage the print cartridges. This reengagement may be accomplished by opening and closing a door of the printing system (200), which causes gears in the printing system to reengage gears in each of the print cartridges.

Figure 4:
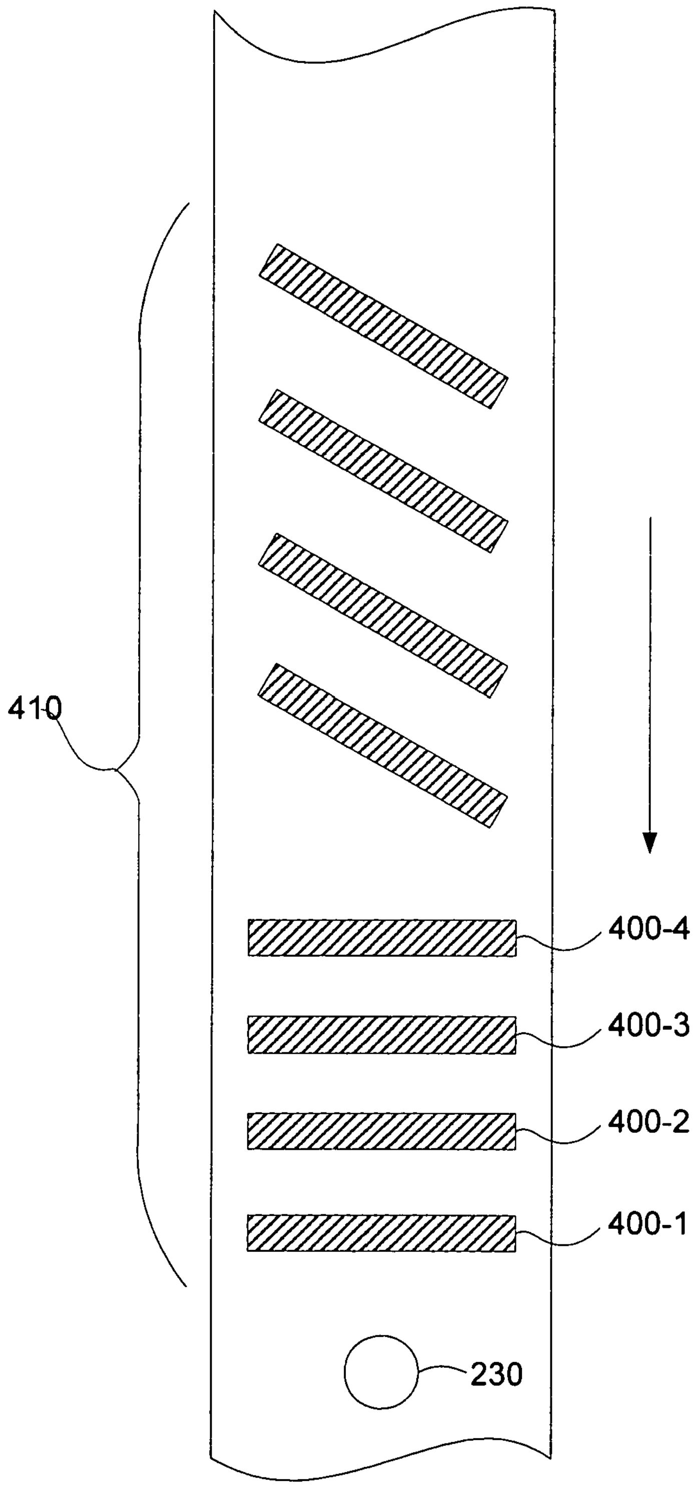
FIG. 4 is a perspective view illustrating a pattern formed on a marking material receiving part according to one exemplary embodiment.

Turning now to FIG. 4, a detailed view is shown of a pattern of printed rotation detection marks (400-1, 400-2, 400-3 and 400-4). The rotation detection marks (400-1, 400-2, 400-3 and 400-4) may be a series of lines or tick marks. Each of the rotation detection marks (400-1, 400-2, 400-3 and 400-4) corresponds to a print cartridge (100-1, 100-2, 100-3 and 100-4 respectively). One group of rotation detection marks (400-1, 400-2, 400-3 and 400-4) is disposed on one side of transfer belt (250; FIG. 2) and another group of rotation detection marks is positioned on another side of transfer belt (250; FIG. 2) (only one side is shown in FIG. 4). The rotation detection marks (400-1, 400-2, 400-3 and 400-4) may also be part of a pattern of alignment marks (410) that are used in the color plane registration operation described above.

The optical sensor (230) is mounted in a fixed position adjacent to one side of the transfer belt (250) and another optical sensor (not shown) is similarly positioned adjacent to the other side. The positioning of the optical sensor (230) is such that each is directly adjacent to the centerline of the respective set of rotation detection marks (400). Each optical sensor preferably comprises a blue light emitting diode, as most toner colors respond well to its wavelength. A photodiode (not shown) is used as the photodetector and a lens (not shown) is used to focus the rotation detection image plane onto the photodiode as the transfer belt (250) moves each rotation detection mark adjacent to the optical sensor (230).

The pattern of alignment marks (410), which may include the rotation detection, is processed in substantially the same way discussed above. The rotation detection marks (400-1, 400-2, 400-3 and 400-4) may be imaged onto the transfer belt (250) first in order to minimize any toner dump if the print cartridges are not properly engaged. Alternatively, the rotation detection marks (400-1, 400-2, 400-3 and 400-4) may be part of pattern of alignment marks (410), as previously discussed.

In either case, detection of each of the rotation detection marks (400-1, 400-2, 400-3 and 400-4) indicates proper rotation of the individual components of each of the print cartridges (100-1, 100-2, 100-3, and 100-4). Again referring to FIG. 1, if components of a particular print cartridge (100) are not rotating, a mark corresponding to that print cartridge (100) is not formed on the transfer belt (250). In particular, if the OPC drum (110; FIG. 1) is not properly engaged and rotating, no image is formed on the transfer belt (250). By way of example, if the OPC drum (110) is not engaged and rotating as the rest of the print cartridge (100) is operating in response to a print job, the developer unit (105) continues to develop toner onto the developer roller (135). When the OPC drum (110) is stationary while the developer roller (135) is rotating, the toner on the developer roller is forced from the developer roller by the stationary OPC drum (110). As a result, toner is released outside of the printing cartridge in an uncontrolled fashion. This uncontrolled release, or toner dump, results in failure of the printing operation. If possible, the dumped toner must then be painstakingly removed from the system before another printing operation can be resumed. In some cases, toner dump may be so extensive as to render further proper operation of the printing system impractical. Improper or incomplete engagement of a single print cartridge can result in toner dump.

Consequently, the optical sensor (230) is configured to detect marks corresponding to each print cartridge. As discussed, the optical sensor (230) may be the same optical sensor used to perform color plane registration operations. Expanding the use of the optical sensor (230) to detect proper engagement and rotation of the OPC drum (110) minimizes the number of sensor required to reliably perform printing operations. A minimal number of sensors simplify system design, which reduces the costs of printing systems. In addition, the increased reliability of such systems further reduces operating costs, because they require less maintenance.

Figure 5:
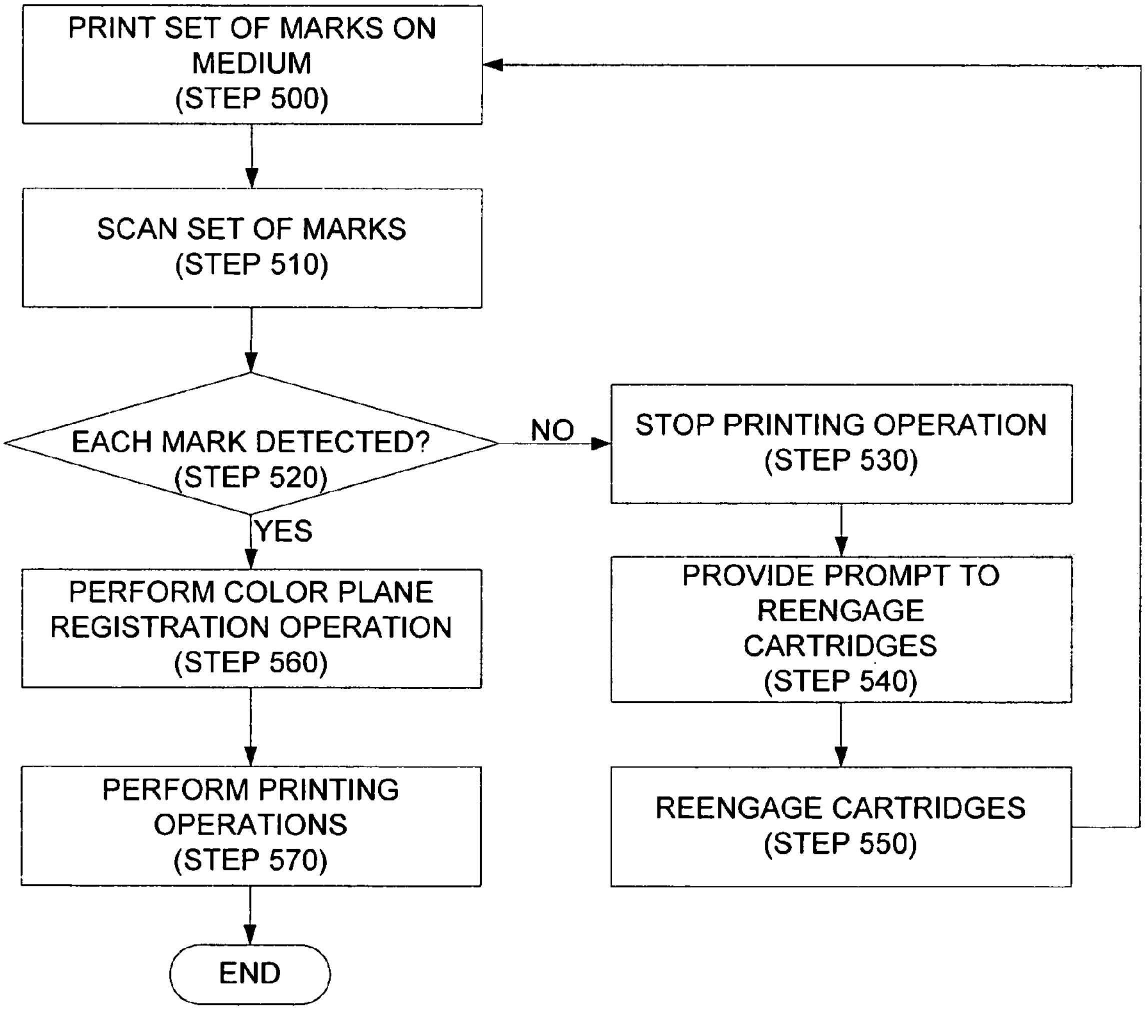
FIG. 5 is a flow chart illustrating a method of operating a printing system according to one exemplary embodiment.

FIG. 5 is a flowchart that illustrates a printing operation including a component rotation detection operation according to one exemplary embodiment. Initially, each print cartridge is caused to print a set of rotation detection marks onto a marking material receiving part (step 500) such as a transfer belt. Thereafter, the set of marks is scanned by an optical sensor (step 510). If each of the marks in the set are detected (YES, step 520) then a color plane registration operation is performed (step 560). Once the color plane registration operation is performed, printing operations are performed (step 570).

If any of one of the set of marks to be imaged on the marking material receiving part is not detected (NO, step 520), then printing operations are stopped (step 530). By stopping the printing operation, toner dump is minimized. A prompt is then provided to reengage the cartridges (step 540). The prompt may be sent to a user interface and may prompt a user to open and close the printer door to reengage the individual components of the cartridges. Once the cartridges have been reengaged (step 550), another set of rotation detection marks are imaged onto the marking material receiving part (step 500). The process continues until all of the rotation detection marks are detected by the optical sensor.

ALTERNATIVE EMBODIMENTS

Figure 6:
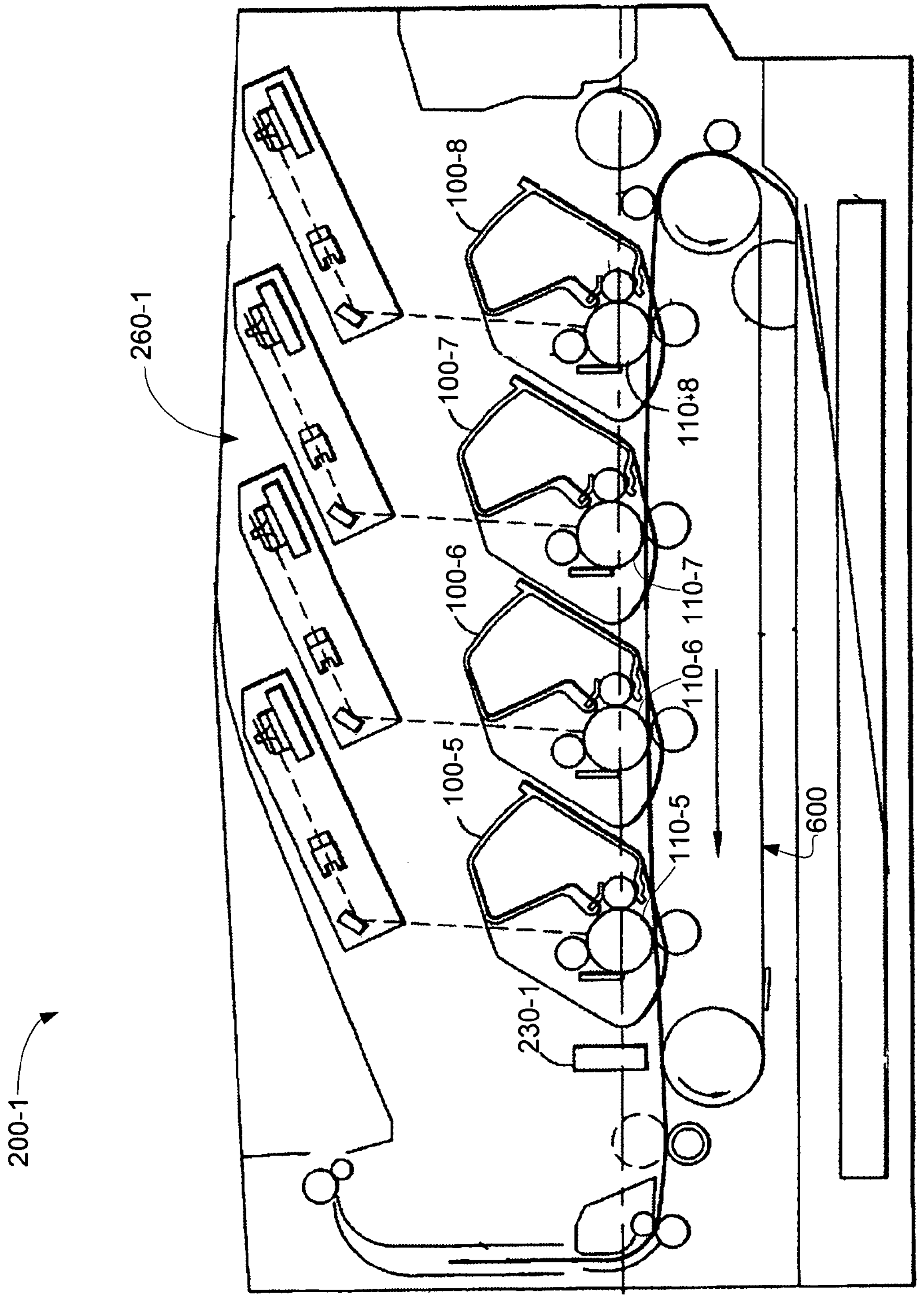
FIG. 6 is a cross-sectional side view illustrating a printing system according to one exemplary embodiment.

While an intermediate transfer belt (ITB) laser printing system has been shown in the embodiments discussed with reference to FIG. 2, the present methods may be incorporated into any type of printing system. As shown in FIG. 6, alternative printing systems (200-1) utilize an electronic transfer belt (ETB) (600). The OPC drums (110-5, 110-6, 110-7, and 110-8) used in conjunction with the ETB (600) are similar to those shown in FIG. 2 (110-1, 110-2, 110-3 and 110-4). In operation, each of the print cartridges (100-5, 100-6, 100-7, and 100-8) forms rotation detection and alignment patterns on the ETB (600).

The patterns make their way from the print cartridges (100-5, 100-6, 100-7, and 100-8) where they were formed, around the image transfer assembly (220). During a startup operation, the images continue on the ETB (600) until they pass the optical sensor (230-1). The optical sensor (230-1) detects the presence of the rotation detection and alignment patterns and passes that information on to a controller (not shown), as described above.

In the embodiments discussed with reference to FIGS. 2 and 6, a single optical sensor (230; FIG. 2; 230-1; FIG. 6) is used to detect the presence of the pattern and to perform the color plane registration. In other embodiments, density sensors may be employed rather than, or in conjunction with, the optical sensor. The density sensors detect the presence of the pattern by detecting the density of the toner developed onto the marking material receiving part. In still other embodiments, a plurality of sensors, including optical and/or density sensors may be used to perform the rotation detection operation and the color plane registration operation.

While the embodiments shown in FIGS. 2 and 6 include a CMYK cartridge assembly, any number of cartridges or any number of configurations of cartridges may benefit from the present method. For example, the single print cartridge (100) illustrated in FIG. 1 may form a single line or tick mark, which may then be detected as described above.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A method of confirming operation of at least one printing system component, comprising:

forming at least one pattern on a marking material receiving part;

inspecting said marking material receiving part with a sensor configured to detect the presence of said pattern;

confirming operation of at least one printing system component based on detection of said pattern with said sensor; and selectively operating or disabling a printing system depending on whether said sensor signals positive detection of said pattern.

2. The method of claim 1, further comprising moving said marking material receiving part past said sensor to inspect for said pattern.

3. The method of claim 1, wherein said pattern comprises a line.

4. The method of claim 1, wherein said marking material receiving part comprises a transfer belt.

5. The method of claim 1, wherein said marking material receiving part comprises a media sheet.

6. The method of claim 5, wherein said media sheet comprises one of a sheet of paper or a plastic sheet.

7. The method of claim 1, wherein said sensor is further configured to perform a color plane registration operation.

8. The method of claim 1, wherein said forming and said inspecting said marking material receiving part is performed during a startup of said printing system.

9. The method of claim 1, wherein said component comprises a rotating printer cartridge component.

10. The method of claim 9, wherein said rotating printer cartridge component comprises an organic photo conductor.

11. The method of claim 1, further comprising providing a prompt to a user if said pattern is not detected.

12. The method of claim 1, wherein confirming operation of at least one printing system component comprises confirming rotation of a photoconductive drum in one or more respective print cartridges.

13. A method of detecting rotation of at least one printer component, comprising:

forming a pattern on a marking material receiving part;

inspecting said marking material receiving part with a sensor configured to detect the presence of said pattern;

confirming operation of a plurality of printer components based on detection of said at least one pattern;

wherein said confirming operation of a plurality of printer components includes forming a plurality of patterns on said marking material receiving part, each of said plurality of patterns corresponding to one of said plurality of printer components; and preventing an operation of said printing system if one or more of said patterns is not detected.

14. The method of claim 13, wherein said plurality of components comprise organic photo conductors.

15. The method of claim 13, wherein said patterns comprise a series of spaced lines.

16. The method of claim 13, wherein said marking material receiving part comprises a transfer belt.

17. The method of claim 13, wherein said marking material receiving part comprises a media sheet.

18. The method of claim 17, wherein said media sheet comprises one of a sheet of paper or a sheet of plastic.

19. The method of claim 13, wherein said sensor is further configured to perform a color plane registration operation.

20. The method of claim 13, wherein forming said pattern is performed during a startup of said printing system.

21. The method of claim 13, wherein said components comprise rotating print cartridge components.

22. The method of claim 21, further comprising providing a prompt if one or more of said patterns is not detected, wherein said prompt is configured to prompt the reengagement of said print cartridges.

23. The method of claim 22, further comprising reengaging said print cartridges.

24. The method of claim 23, wherein said reengaging said print cartridges restarts said method.

25. The method of claim 13, further comprising providing a prompt to a user if one or more of said patterns is not detected.

26. The method of claim 13, wherein confirming operation of a plurality of printer components comprises confirming rotation photoconductive drums in respective print cartridges.

27. The method of claim 13, further comprising moving said marking material receiving part past said sensor to inspect for said at least one pattern.

28. A method for starting up a printing system, comprising:

conducting a rotation detection operation, said rotation detection operation including forming a plurality rotation detection marks on a marking material receiving part corresponding to a plurality of print cartridges, conveying said marking material receiving part past a sensor to detect a presence of said rotation detection marks, and preventing an operation of said printing system in response to a non-detection of said pattern; and performing a color plane registration operation, said color plane registration operation including forming a plurality of alignment marks on said marking material receiving part, and conveying said marking material receiving part past said sensor.

29. The method of claim 28, further comprising continuing an operation of said printing system in response to a detection pattern.

30. The method of claim 28, wherein said rotation detection marks comprise a subset of said alignment marks.

31. The method of claim 28, wherein said rotation detection marks are separate from said alignment marks.

32. A printing system, comprising:

a plurality of print cartridges, each configured to form a rotation detection mark on a marking material receiving part during a startup operation;

at least one sensor configured to sense said rotation detection marks; and a controller configured to selectively operate or disable said printing system in response to whether said sensor signals positive detection of said rotation detection marks.

33. The system of claim 32, wherein said plurality of print cartridges comprise a cyan ink filled print cartridge, a magenta ink filled print cartridge, a yellow ink filled print cartridge, and a black ink filled print cartridge.

34. The system of claim 32, wherein said marking material receiving part comprises an intermediate transfer belt.

35. The system of claim 32, wherein said marking material receiving part comprises an electronic transfer belt.

36. The system of claim 32, wherein said sensor comprises an optical sensor.

37. The system of claim 32, wherein said sensor comprises a density sensor.

38. The system of claim 32, wherein said sensor is also used by said controller to perform color plane registration.

39. The system of claim 32, further comprising an interface through which a user is prompted if said sensor fails to detect said rotation detection marks.

40. The system of claim 39, wherein said interface prompts said user to re-engage one or more of said print cartridges.

41. A printing system, comprising:

means for forming a rotation detection mark;

means for detecting the presence of said rotation detection mark; and means for selectively preventing operation of said printing system if said rotation detection mark is not detected by said means for detecting.

42. The printing system of claim 41, further comprising means for allowing an operation of said printing system in response to a detection of said detection marks.

43. The printing system of claim 41, wherein said means for forming rotation marks further comprises means for forming alignment marks.

44. The printing system of claim 43, wherein said means for detecting said rotation detection marks is also configured to detect said alignment marks.

45. A printing system, comprising:

at least one print cartridge configured to form a rotation detection mark on a marking material receiving part during a startup operation, said mark indicating that components are rotating as intended within said at least one print cartridge;

at least one sensor configured to sense said rotation detection mark; and a controller configured to selectively operate or disable said printing system in response to whether said sensor signals positive detection of said rotation detection mark.

46. The system of claim 45, wherein said sensor is also used by said controller to perform color plane registration.

47. The system of claim 45, further comprising an interface through which a user is prompted if said sensor fails to detect said rotation detection marks.

48. The system of claim 47, wherein said interface prompts said user to re-engage said print cartridge.

49. A method of preventing toner dump in a printing system, said method comprising:

with a print cartridge, attempting to form at least one pattern on a marking material receiving part;

inspecting said marking material receiving part with a sensor configured to detect said pattern; and determining whether components in said print cartridge are rotating as intended based on whether said pattern is or is not detected.

50. The method of claim 49, further comprising selectively operating or disabling said printing system depending on whether said sensor signals positive detection of said pattern.

* * * * *